(12) United States Patent
Powell

(10) Patent No.: US 6,637,986 B2
(45) Date of Patent: Oct. 28, 2003

(54) DRILLING APPARATUS AND METHOD

(75) Inventor: Michael Powell, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 78 days.

(21) Appl. No.: 09/994,305

(22) Filed: Nov. 26, 2001

(65) Prior Publication Data

US 2003/0099520 A1 May 29, 2003

(51) Int. Cl.[7] .......................... B23B 35/00; B23B 47/32
(52) U.S. Cl. ........................ 408/1 R; 408/10; 408/17
(58) Field of Search ........................ 408/1 R, 3, 10, 408/14, 17, 61

(56) References Cited

U.S. PATENT DOCUMENTS

| | | | | |
|---|---|---|---|---|
| 3,487,729 A | * | 1/1970 | Juhasz et al. ............. | 408/14 |
| 3,767,313 A | * | 10/1973 | Bohoroquez et al. ....... | 408/14 |
| 4,546,834 A | * | 10/1985 | Menzel ................. | 173/146 |
| 4,655,650 A | * | 4/1987 | Crawford et al. ......... | 408/225 |
| 4,688,970 A | * | 8/1987 | Eckman ................ | 408/9 |
| 4,867,617 A | * | 9/1989 | Maass et al. ............ | 408/17 |
| 5,544,985 A | * | 8/1996 | Lane ................... | 408/56 |
| 5,833,404 A | | 11/1998 | Johnson et al. | |
| 6,371,701 B1 | * | 4/2002 | Blankenship et al. ...... | 408/14 |

* cited by examiner

*Primary Examiner*—Daniel W. Howell
(74) *Attorney, Agent, or Firm*—Scott A. McBain

(57) ABSTRACT

The invention provides a drilling apparatus and method for drilling a hole in a workpiece. The drilling apparatus includes means for rotating a drill bit and means for advancing the rotating drill bit into a workpiece to a first depth. The drilling apparatus further includes means for dwelling the drill bit within the workpiece at the first depth for a dwell time and means for further advancing the rotating bit to a second depth after the dwell time has expired. The drilling method includes rotating a drill bit and advancing the rotating drill bit into the workpiece to a first depth. The method farther includes dwelling the drill bit within the workpiece at the first depth for a dwell time and further advancing the rotating bit to a second depth after the dwell time has expired.

14 Claims, 2 Drawing Sheets

DRILLING APPARATUS AND METHOD

TECHNICAL FIELD OF THE INVENTION

The present invention relates generally to drilling. More particularly, the invention relates to an apparatus and method for drilling a hole (e.g., during machining drill operations).

BACKGROUND OF THE INVENTION

Long "chips" formed during a hole-making operation (e.g., drilling, reaming, boring, etc.) may cause numerous problems in a machining operation. The chips may tangle around a drill tooling thereby requiring cleaning downtime after each operation. Failure to adequately remove long chips may shorten the tool life and may result in degraded holes that do not meet specification. Therefore, it would be desirable for a drilling method and apparatus to provide long chip removal or elimination.

In an effort to deal with long chip formation, a 'pecking' cycle strategy has been developed. The pecking cycle may involve repeatedly and completely retracting the drill tooling from a partially formed hole. For example, U.S. Pat. No. 5,833,404 issued Nov. 10, 1998 to Johnson et al. is an example of a portable peck feed drilling system. In the Johnson patent, operation of the drilling system includes advancing a rotating drill bit into a workpiece followed by full retraction to "home" position. The process may be repeated to drill to a desired depth. The pecking cycle demonstrated by the Johnson and other patents may overcome several problems associated with long chip formation.

A shortcoming associated with pecking cycle drilling operations relates to overall operation time. The need for full and repeated removal of the drill tooling from a forming hole increases the overall operation time with each pecking cycle. In addition, some pecking cycles may adversely affect the surface finish of the hole. For example, tool markings may be made within the hole when the drill tooling is fed back at a rapid feed-rate after each cycle. This may result in a degraded hole that does not meet specification. To avoid making tool markings, the drill tooling may be fed back into the forming hole at a slower rate thereby further increasing the pecking cycle time. As such, it would be desirable for a drilling method and apparatus to provide short overall operation time while maintaining hole specification.

Therefore, it would be desirable to provide a method and apparatus for drilling a hole that overcomes the aforementioned and other disadvantages.

SUMMARY OF THE INVENTION

One aspect of the present invention provides a drilling apparatus including means for rotating a drill bit, and means for advancing the rotating drill bit into a workpiece to a first depth. The drilling apparatus further includes means for dwelling the drill bit within the workpiece at the first depth for a dwell time, and means for further advancing the rotating bit to a second depth after the dwell time has expired. The apparatus may include means for flowing a fluid adjacent the rotating drill bit. The apparatus may further include means for determining at least one drilling parameter, and means for controlling at least one of the first depth, the dwell time, and the second depth based on the drilling parameter.

Another aspect of the invention provides a method for drilling a hole in a workpiece. The drilling method includes rotating a drill bit, and advancing the rotating drill bit into the workpiece to a first depth. The method further includes dwelling the drill bit within the workpiece at the first depth for a dwell time, and further advancing the rotating bit to a second depth after the dwell time has expired. The dwell time may be estimated from a dwell equation. A fluid may be flowed adjacent the rotating drill bit. At least one drilling parameter may be determined, and at least one of the first depth, the dwell time, and the second depth may be controlled based on the drilling parameter. The drilling parameters may be determined based on a control sequence and/or a database including at least one drilling factor. The drilling factor may include a workpiece material characteristic, a desired hole geometry, a drill bit characteristic, and a fluid flow characteristic.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
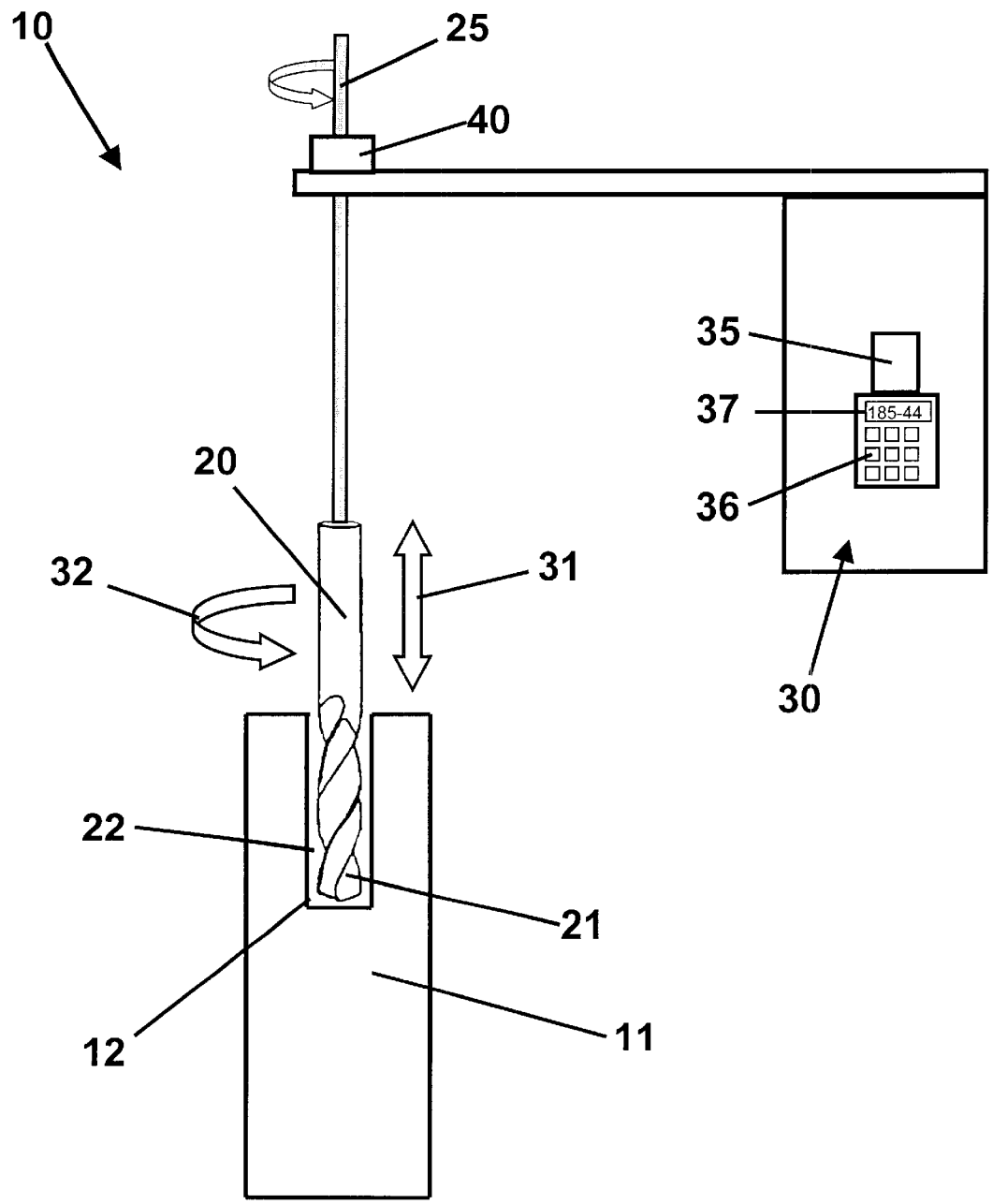
FIG. 1 is a diagram of a drilling apparatus made in accordance with the present invention.

Referring to the drawings, FIG. 1 is a diagram of a drilling apparatus made in accordance with the present invention and shown generally by numeral 10. In the following description, "drilling" refers to a process whereby material is removed from a workpiece 11 to form a hole 12. The process includes hole-making operations such as drilling, reaming, boring, and the like.

The drilling apparatus 10 may include a drill bit 20 operably attached to a rod 25. The drill bit 20 and rod 25 may be moved during a controlled drilling process by an actuator 30. The actuator 30 may provide vertical 31 (e.g., advance and withdrawal) and rotational 32 movements during the controlled drilling process. The actuator 30 may include a logic chip 35 for determining drilling parameters specifying timing, speed, directionality, and variations therein of the vertical 31 and rotational 32 movements. The logic chip 35 may be any number of devices capable of processing information, such as a computer microprocessor, and may include memory for storing information, such as a database. The actuator 30 may further include a keypad 36 and display 37 for programming and viewing information used by the logic chip 35, respectively. The drilling parameters, and corresponding vertical 31 and rotational 32 movements, may be actuated by one or more motors 40 controlled by the logic chip 35. The motors 40 may be of any variety of electric motors, hydraulic units, and the like, recognized in the art for providing rotational and vertical movements.

The workpiece 11 may be formed from any number of material(s) capable of receiving the hole 12. For example, the workpiece 11 may be formed from a material including, but not limited to, composites, concrete, glass, masonry, metal, metal alloy, plastic, polymer, stone, wood, or combinations thereof. The drill bit 20 may be any number of tools designed for drilling a hole into material. For example, the drill bit 20 may be a twist drill, gun drill, trepanning drill, reamer, boring tool, counter bore, counter sink, step drill, or the like. Those skilled in the art will recognize that workpiece 11 constitution and type of drill bit 20 may be varied while still providing any number of advantages associated with the present invention.

The drilling apparatus 10 may be used to precisely drill the hole 12 in the workpiece 11 in a relatively short time. Removal of debris including long chips produced during drilling may be enhanced by flowing a fluid 22 adjacent the rotating drill bit 20. In one embodiment, the fluid 22 may be a stream of gas or liquid (e.g., air, water, oil, etc.) flowing into the hole 12 through channels 21 formed within the drill bit 20. In another embodiment, the fluid 22 may be a stream of gas or liquid flowing into the hole 12 from a hose placed adjacent to the hole 12 exterior. Those skilled in the art will recognize that numerous strategies may be used for removing debris during drilling operations.

Figure 2:
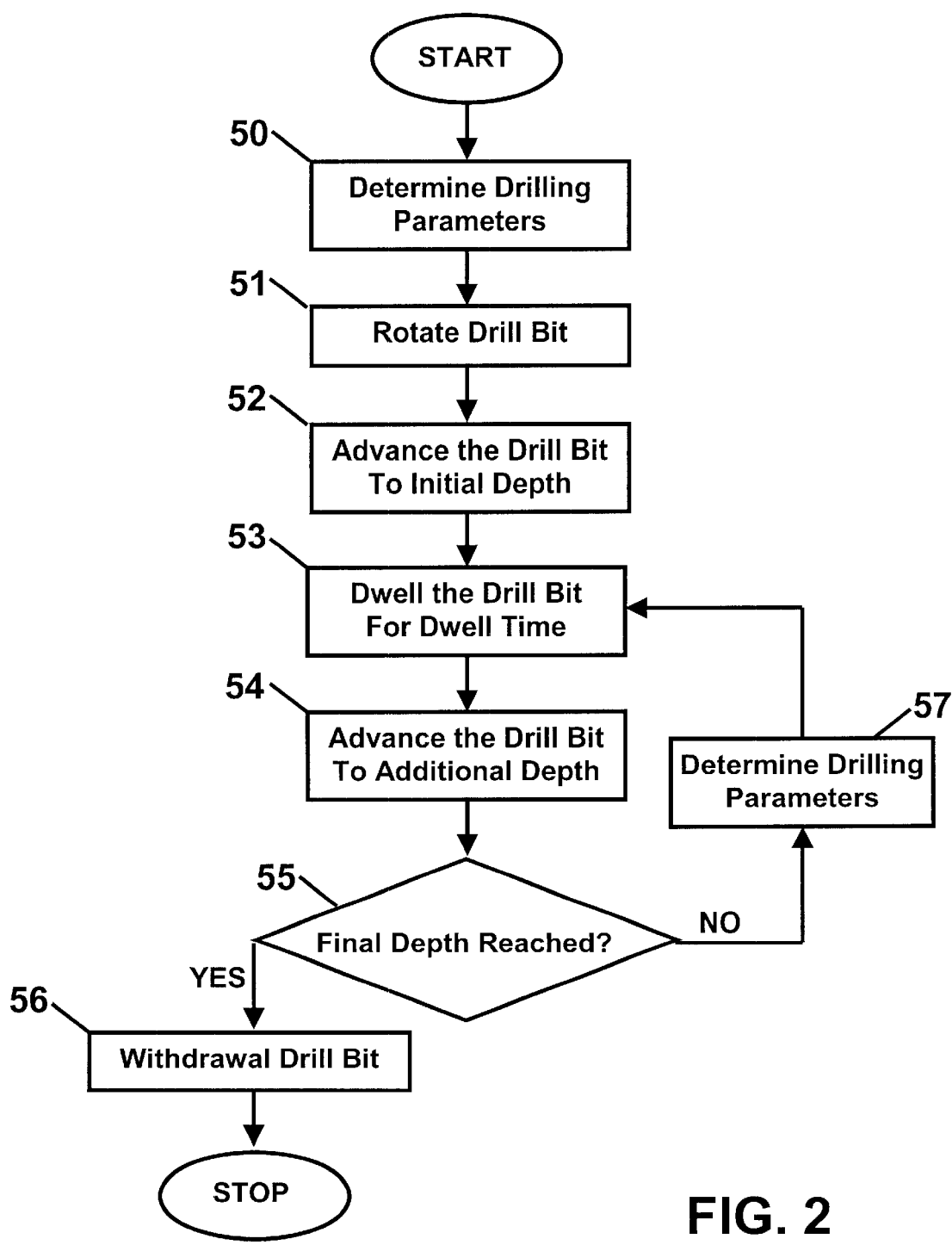
FIG. 2 is a flow diagram of a method for drilling a hole in a workpiece made in accordance with the present invention.

Referring now to the drawings collectively, FIG. 2 is a flow diagram of a method for drilling a hole in a workpiece made in accordance with the present invention. The drilling method may be implemented on the drilling apparatus 10 of FIG. 1. Accordingly, the following description of the drilling method will be made with reference to the drilling apparatus 10. The drilling method may include determining one or more drilling parameters (Step 50). Drilling parameter determination may provide either a generalized or a specific strategy for forming a hole in the workpiece 11. In one embodiment, the drilling parameters may be determined as a function of the logic chip 35. Those skilled in the art will recognize that a number of devices or entities may be used for determining the drilling parameters.

Drilling parameter determination may be based on a control sequence. In one embodiment, the control sequence may specify drilling parameters for performing a drilling procedure without requiring drilling factor consideration. For example, the control sequence may include generalized drilling parameters used generically for a variety of drill bit 20 and workpiece 11 combinations.

The drilling parameters may also be determined based on a database including one or more drilling factors. In one embodiment, the database may include information used to govern drilling parameters for specific drill bit 20 and workpiece 11 combinations. For example, the database may include information for specifying drilling parameters when a certain drill bit 20 is used with a certain workpiece 11 material or class of materials. The specifications may change when a different drill bit 20 is used. Determining the drilling parameters based on a variety of factors may optimize the drilling procedure by shortening overall operation time, prolonging drill bit life, and maintaining hole specification.

The database of drilling factors may include such information as workpiece material characteristics, desired hole geometry, drill bit characteristics, and fluid flow characteristics. The workpiece material characteristics may include factors such as size, shape, geometry, density, rigidity, and other information pertaining to the constitution of the workpiece and its constituent material(s). The desired hole geometry may include factors such as width, depth, shape, and other information pertaining to the geometry of the desired hole. The drill bit characteristics may include factors such as a drill point geometry, drill flute geometry, drill flute number, preferable advancement rate, preferable rotation rate, preferable material, constitution, durability, and other information pertaining to the nature of the drill bit. The fluid flow characteristics may include factors such as flow rate, fluid constitution, density, viscosity, boiling point, and other factors pertaining to the fluid used for the removal of debris produced during drilling. Those skilled in the art will recognize that various other drilling factors may be considered when determining drilling operation parameters.

The control sequence and database information may be pre-programmed into the memory portion of the logic chip 35. Additionally, the control sequence and database information may be programmed and/or modified through the keypad 36, and viewed on the display 37. The logic chip 35 may then access the control sequence and database information to calculate the drilling parameters. The drilling parameters may contain the information required to perform each aspect of the drilling procedure. For example, the logic chip 35 may interpret the drilling parameters to control the motors 40 and, thus, the vertical 31 and rotational 32 drilling movements.

Drilling may begin by rotating the drill bit 20 (Step 51). At this point, the drill bit 20 is typically positioned adjacent the workpiece 11. The rotation speed of the drill bit 20 may be specified as a drilling parameter. After reaching a desired rotation rate, the drill bit 20 may be advanced into the workpiece 11 to an initial depth (Step 52). The advancement rate, rotation rate, and initial depth may be specified as a drilling parameter and may be influenced by numerous drilling factors. As such, these factors may be programmed into the database for determining suitable advancement rate, rotation rate, and initial depth. In one embodiment, the drill bit 20 may be rotated and advanced at a rate and depth that limits hole degradation, drill bit 20 wear, and excessive long chip formation.

After reaching the initial depth, drill bit 20 vertical movement (e.g., advance and withdrawal) is stopped (Step 53). Long chips produced during the advancement phase may begin to twist around the drill bit 20 presenting potential problems. To prevent these problems, advancement may be stopped while still maintaining rotation. As the drill bit 20 continues to rotate, long chips are cut apart as the "stream" of material provided by advancement is interrupted. The stopped advancement with concurrent rotation, or "dwelling", may occur for a predetermined dwell time. The dwell time and rotation speed during the dwell may be specified as a drilling parameter and may be influenced by numerous drilling factors. As such, these factors may be programmed into the database for determining suitable dwell time and rotation speed during the dwell. In one embodiment, the logic chip 35 may calculate the dwell time from an equation:

$$\text{Dwell Time} = 1/RPM*60*H$$

In the equation, the dwell time (e.g., seconds) equals the reciprocal of the drill bit rotation rate (e.g., rotations per minute) multiplied by 60 and a hardness factor, H. The factor, H, may be based on the "hardness" of the workpiece material. For example, the hardness factor may range from about 1.1 for harder materials to 1.2 for softer materials. The hardness factor compensates for "spring-back" that is associated with softer materials. Long chips produced from softer material may expand, or "spring-back", thereby preventing long chip breakage. The hardness factor for a variety of materials may be stored in the database as a workpiece material characteristic. In the example, dwell time may occur for a period of time requiring only 1.1–1.2 drill bit revolutions. At a rotation rate of 10,000 rpm, the dwell time is about 7 milliseconds. Therefore, problems associated with long chips formation may be resolved in a fraction of the time needed to withdraw the drill bit 20 during a pecking cycle.

After the dwell time has expired, the drill bit 20 may be further advanced to an additional depth (Step 54). As with advancement to the initial depth, the advancement rate, rotation rate, and additional depth may be specified as a drilling parameter and may be influenced by numerous drilling factors. Drilling continues until the additional depth is reached. At this point, the logic chip 35 may determine if a final depth has been reached (Step 55). The final depth may be specified as a drilling parameter. If the final depth has been reached, the drill bit 20 may be withdrawn from the hole 12 thereby ending the drilling process (Step 56). If the final depth has not been reached, additional drilling parameters may be determined (Step 57) followed by repeated dwell and advancement phases. This process may repeat until the final depth is reached and the drill bit 20 withdrawn.

While the embodiments of the invention disclosed herein are presently considered to be preferred, various changes and modifications can be made without departing from the spirit and scope of the invention. For example, the described apparatus and method of drilling a hole are not limited to any particular design or sequence. Specifically, the actuator and drill bit configuration, constitution of the workpiece, drilling phase order, and drilling parameters and associated determinations may vary without limiting the utility of the invention. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A drilling apparatus composing:
   means for rotating a drill bit;
   means for advancing the rotating dull bit into a workpiece to a first depth;
   means for dwelling the drill bit within the workpiece at the first depth for a dwell time;
   means for further advancing the rotating bit to a second depth after the dwell time bits expired;
   means for determining at least one drilling parameter; and
   means for controlling at least one of the first depth, the dwell time, and the second depth based on the drilling parameter.

2. The apparatus of claim 1 further comprising means for flowing a fluid adjacent the rotating drill bit.

3. A method for drilling a hole in a workpiece, the method comprising:
   rotating a drill bit;
   advancing the rotating drill bit into the workpiece to a first depth;
   dwelling the drill bit within the workpiece at the first depth for a dwell time, wherein the dwell time is estimated from a dwell equation; and
   further advancing the rotating bit to a second depth after the dwell time has expired.

4. The method of claim 3 further comprising flowing a fluid adjacent the rotating drill bit.

5. The method of claim 3 further comprising:
   determining at least one drilling parameter; and
   controlling at least one of the first depth, the dwell tune, and the second depth based on the drilling parameter.

6. The method of claim 5 wherein the drilling parameters are determined based on a control sequence.

7. The method of claim 5 wherein the drilling parameters are determined based on a database including at least one drilling factor.

8. The method of claim 7 wherein the drilling factor is selected from a group consisting of a workpiece material characteristic, a desired bole geometry, a drill bit characteristic, and a fluid flow characteristic.

9. A method for drilling a hole in a workpiece, the method comprising:
   determining at least one drilling parameter;
   rotating a drill bit;
   advancing the rotating drill bit into die workpiece to a first depth;
   dwelling the drill bit within the workpiece at die first depth for a dwell time;
   further advancing the rotating bit to a second depth after the dwell time has expired; and
   controlling at least one of the first depth, the dwell time, and the second depth based on the drilling parameter.

10. The method of claim 9 wherein the dwell time is estimated from a dwell equation.

11. The method of claim 9 further comprising flowing a fluid adjacent the rotating drill bit.

12. The method of claim 9 wherein the drilling parameters are determined based on a control sequence.

13. The method of claim 9 wherein the drilling parameters are determined based on a database including at least one drilling factor.

14. The method of claim 13 wherein the drilling factor is selected from a group consisting of a workpiece material characteristic, a desired hole geometry, a drill bit characteristic, and a fluid flow characteristic.

* * * * *